UNITED STATES PATENT OFFICE.

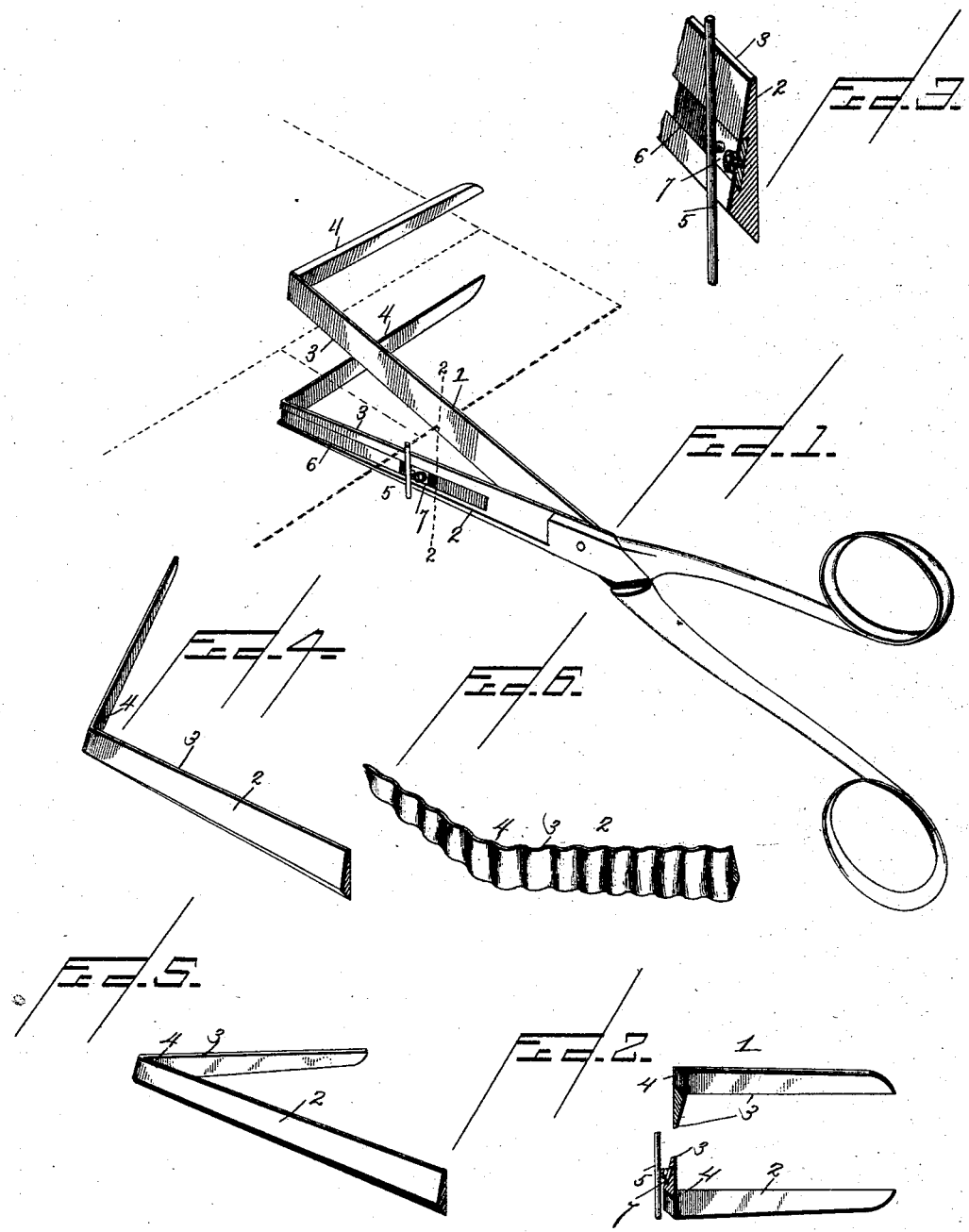

WILLIAM BINGHAM CLARKE, OF KANSAS CITY, MISSOURI.

SHEARS.

SPECIFICATION forming part of Letters Patent No. 491,078, dated February 7, 1893.

Application filed September 8, 1892. Serial No. 445,329. (No model.)

*To all whom it may concern:*

Be it known that I, WILLIAM BINGHAM CLARKE, of Kansas City, Jackson county, Missouri, have invented certain new and useful Improvements in Shears for Special Purposes, of which the following is a full, clear, and exact description, reference being had to the accompanying drawings, forming a part hereof.

My invention relates to improvements in shears for special purposes, and is particularly useful for clipping coupons and for cutting fancy work where two sides are to be cut from the sheet.

The object of my invention is to provide a simple, inexpensive, light and durable implement not liable to derangement and made adjustable to suit the size of work to be done.

My invention consists in making the shears' blades angular which will admit of first a direct cut and then a cross cut at any desired angle with the direct cut at a single operation and without removing the shears from the material.

In the accompanying drawings which illustrate the preferred form of my invention:—

Figure 1 is a perspective of a pair of shears of the simplest form embodying my invention. Fig. 2 a transverse section of the same in the line 2x2 of Fig. 1. Fig. 3 an enlarged sectional perspective of a portion of one of the blades, through the adjustable gage plate. Fig. 4 a perspective of a part of one of the blades formed with an obtuse angle. Fig. 5 a similar view of a part of a blade having an acute angle. Fig. 6 a perspective of a part of a blade formed with fluting.

The blades 1—2— —2 as shown in Figs. 1 and 2 are made with straight cutting edges 3, and are bent at 4 to a right angle in which form they are useful for cutting off coupons or rectangular blanks from a sheet where both a direct and a cross cut are required. In order to limit the cut to the length desired, I provide an adjustable stop, and in order to adjust the said stop upon the shears in a simple and inexpensive manner, and adapt it to be moved longitudinally to any degree of graduation desired, within the length of the blade, I form a longitudinal dove tailed groove 6 in the outer side of one of the blades of the shears, into which is fitted a block 7 similarly dove tailed to fit the slot and held at any desired point therein by a set screw fitted in a threaded hole in the block and clamping or impinging against the bottom of the slot 6 securely holding the block upon the blade. A short pin or stud projects outwardly from the block 7, and may be made integral therewith or screwed therein as desired, and a vertically extending rod 5, is provided at the outer end of the pin or stud, which projects both above and below the edges of the blade to which it is attached, so that, when placing the adjustable stop in position, either end of the sliding plate 7 thereof, may be inserted first into the groove of the blade, and always have one end of the rod 5, projecting beyond the cutting edge of the blade, to limit the length of the cut made thereby. The blades may be made of cast or malleable metal with the dove-tailed groove cast therein, and a steel cutting edge secured thereto, or they may be rolled up of solid steel. The first is the least expensive and in many respects preferable for this form of shears which is mainly designed for light work, but light pressure being required to sever the material. With coupons the sheets are perforated in both directions and a slight pressure brought upon the blades will cut the coupons clear from the sheet with a single movement and without removing the shears from the material. The gage pin is accurately set so that the center line of the perforations is always presented with great accuracy and celerity in the light or in the dark. When angular blanks other than a right angle are to be cut the blades are formed as shown in Figs. 4 and 5, and when fluted edges are to be cut for ornament or fancy work for ladies' trimmings the blades as shown in Fig. 6 are made with corrugations 7 or with their edges only corrugated to effect this purpose. When the blades are corrugated it will be necessary to have the corrugations of the inner blades made slightly curved or concentric as shown in the drawings to the pivot of the shears, in order that the corrugations of one blade may be made to pass the corrugations of the other blade.

The special form of adjustable gage herein described is applicable to shears generally as the rod projecting both above and below the blades admits of the reversal of the gage and the longitudinal slot in the blade admits of close graduation of the length of the cut.

Having thus described my invention what I claim as new and desire to secure by Letters Patent is:—

A shears, having one of the blades, thereof, provided with a longitudinally extending groove, in its outer side, and a sliding block adapted to slide within said groove, and a stop bar carried by the sliding block, projecting both above and below the upper and lower edges of the blades, substantially as described.

In testimony whereof I affix my signature in the presence of two witnesses.

WILLIAM BINGHAM CLARKE.

Witnesses:
E. M. FITZPATRICK,
M. R. REMLEY.